J. Price,

Wheel Plow.

No. 101,038. Patented Mar. 22, 1870.

Witnesses:
A. W. Almquist
Jno. F. Brooks

Inventor:
Jacob Price
per
Attorneys.

United States Patent Office.

JACOB PRICE, OF SAN LEANDRO, CALIFORNIA.

Letters Patent No. 101,038, dated March 22, 1870.

IMPROVEMENT IN GANG-PLOWS.

The Schedule referred to in these Letters Patent and making part of the same.

*To all whom it may concern:*

Be it known that I, JACOB PRICE, of San Leandro, in the county of Alameda and State of California, have invented a new and useful Improvement in Gang-Plows; and I do hereby declare that the following is a full, clear, and exact description thereof, which will enable others skilled in the art to make and use the same, reference being had to the accompanying drawings forming part of this specification, in which—

Similar letters of reference indicate corresponding parts.

My invention has for its object to furnish an improved gang-plow, which shall be so constructed and arranged that the driver can raise the plows from the ground without having to raise himself at the same time; and It consists in the construction and combination of the various parts, by means of which these adjustments are effected, as hereinafter more fully described.

A are the plows, the standards of which are securely attached to the rear parts of the beams B.

Figure 1:
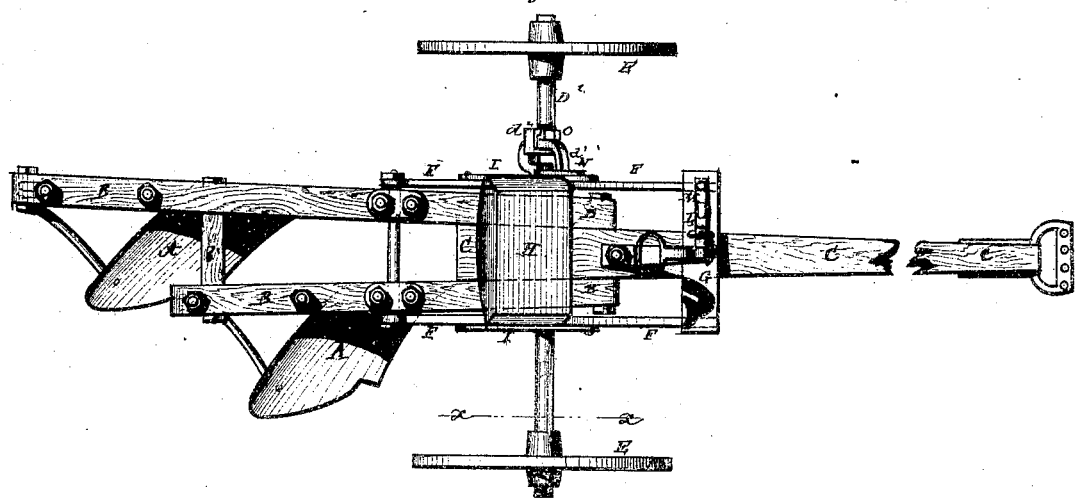
Figure 1 is a top view of my improved gang-plow.

The rear parts of the beams B are connected and held in their proper relative positions by a cross-bar $b'$, as shown in fig. 1.

The forward ends of the beams B are securely bolted to the rear end of the tongue C, which is thus rigidly connected with the said plow-beams.

$D^1\ D^2$ is the axle, which is made in two parts, and upon the journals of which the wheels E revolve in the ordinary manner.

Figure 2:
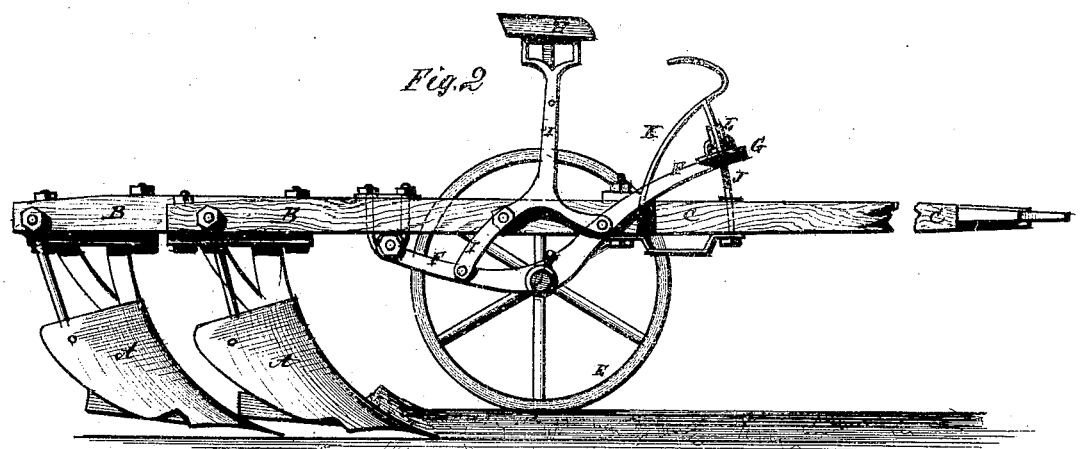
Figure 2 is a side view of the same partly in section, through the line $x\ x$, fig. 1.

F are two bent levers made in about the form shown in fig. 2, and the forward ends of which are connected and held in their proper relative positions by the foot-board G.

The levers F have holes formed in them for the passage of the longer part $D^1$ of the axle, which axle thus becomes the fulcrum of said levers.

The rear ends of the levers F are connected to each other, and at the same time pivoted to the rear parts of the beams B, by being attached to the ends of a long bolt which is connected with the said beams by eye-bolts or staples, as shown in figs. 1 and 2.

H is the driver's seat, which is attached to and supported by the standards I, the lower ends of which are made branched, and are securely riveted or bolted to the front and rear arms of the levers F, as shown in fig. 2.

Figure 3:
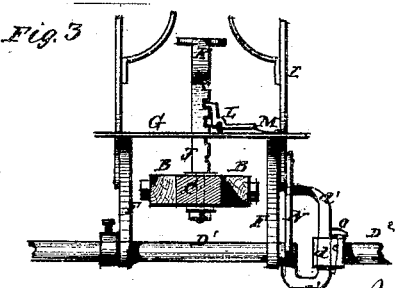
Figure 3 is a detail view of a part of the same.

J is a bar, the lower end of which is securely attached to the tongue C, and which has notches formed in its side edge, as shown in fig. 3.

The rack-bar J passes up through a hole in the foot-board G, and its upper end is securely attached to or formed solid with the brace-bar K.

The lower end of the brace-bar K is securely attached to the tongue C, and upon its upper end is formed a loop or handle for the driver to take hold of when raising the plows from the ground.

L is a bent lever, which is pivoted to the foot-board G in such a position that the catch formed upon the upper arm of said lever may enter the notches in the rack-bar J, and hold the plows securely in the position to which they may have been raised.

Beneath the end of the other arm of the lever-catch L, which extends along the upper side of the foot-board G, is placed a spring, M, which holds the said arm raised to hold the catch of said lever forward against the rack-bar J, until withdrawn by the driver by placing his foot upon the said horizontal arm of the said lever-catch L.

Upon the inner end of the part $D^1$ of the axle is formed, or to it is attached an arm, $d'$, which is made in about the form and manner shown in fig. 3, and the vertical part of which passes through a socket, $d^2$, formed in or attached to the inner end of the part $D^2$ of the axle.

The upper end of the arm $d^1$ is bent inward, and enters a hole in the bar N, the upper end of which is riveted or bolted to the standard I, and the lower end of which is notched to fit and ride upon the part $D^1$ of the axle.

The bar N supports the upper end of the arm $d^1$ against the draft strain.

The socket $d^2$ is made larger than the body of the arm $d^1$ upon which it is placed, and is secured in place, when adjusted at the desired height, by a wedge, O, driven into the said socket upon the outer side of the said arm $d^1$, as shown in fig. 3.

This construction enables the height of the near wheel E to be raised or lowered as the depth of the furrows may require.

When the plows are to be raised, the driver places his foot upon the horizontal arm of the lever L, and thus removes the catch of said lever from the rack-bar J.

He then throws his weight upon the foot-board G, which raises the rear ends of the beams B and also the plows connected with said beams.

If desired or necessary, the driver may increase the effect of his weight by pulling upon the handle of the bars J K.

To lower the plows, the driver withdraws the spring lever-catch L from the rack J with his foot, which allows the plows to drop to the desired depth.

Having thus described my invention,

I claim as new and desire to secure by Letters Patent—

1. The levers F, constructed as described, and having the foot-board G attached to their forward ends, in combination with the axle $D^1 D^2$, and plow-beams B, substantially as herein shown and described, and for the purpose set forth.

2. The combination of the rack-bar J, brace-bar K, and spring lever-catch L M, with the foot-board G, levers F, beams B, and tongue C, substantially as herein shown and described, and for the purposes set forth.

The above specification of my invention signed by me this 26th day of October, 1869.

JACOB PRICE.

Witnesses:
J. L. KIRKMAN,
G. E. SMITH.